Patented May 27, 1930

1,760,360

UNITED STATES PATENT OFFICE

HARRISON P. HOOD, OF CORNING, NEW YORK, ASSIGNOR TO CORNING GLASS WORKS, OF CORNING, NEW YORK, A CORPORATION OF NEW YORK

REFRACTORY PRODUCT

No Drawing. Original application filed January 26, 1922, Serial No. 531,970. Divided and this application filed April 27, 1923, Serial No. 635,132. Renewed June 18, 1928.

This application which is filed as a division of my prior application, Serial No. 531,970, filed January 26, 1922, issued as Patent 1,527,874 relates to a new refractory product for use in manufacturing bricks, blocks or tiles that are used in the construction of, or the lining of glass melting tanks, and furnaces; and also such containers as pots and crucibles, where a highly refractory material is desirable to resist the solvent action of glass or other liquid substances.

I have found that an aluminum silicate in the form of sillimanite (63.2% $Al_2O_3$ and 36.8% $SiO_2$) when worked up into the desired form can be used in lieu of the usual clay refractories in the various containers for molten glass for the purpose had in view.

In the present case there is described as an embodiment of my invention the manufacture of tank blocks, fire-bricks, tiles, melting pots, crucibles, or other similar articles out of powdered sillimanite, and in the following description the term "block" is used for the sake of brevity, as my invention is not limited to any form of article.

According to one embodiment of my invention, for the purpose of manufacturing a block or in preparing the material for the purpose of forming blocks or other suitable apparatus the ingredients, preferably in the form of artificial sillimanite, are first ground to a fine powder, I have ground the material to about 400 mesh with satisfactory results, but if increased strength and finer grain is desired in the final product, the particles should be ground to about 800 mesh or finer.

At the completion of the grinding operation each particle of the material will be composed of pure sillimanite. To this powdered material is added sufficient liquid to form a soft paste. Such liquid can be a solution or a hydrosol of silicic acid and hydrate of alumina in the desired proportion, or gels of these collodial solutions. By gel is meant the semi-solid produced when the collodial particles in the solutions or hydrosols partially agglomerate and precipitate.

Such solution may contain 3 parts by weight of $SiO_2$ and 5 parts by weight of $Al_2O_3$. Such solution will therefore be composed of alumina and silica in the molecular ratio of 1 to 1, which will be substantially the same as that found in pure sillimanite.

When the above mentioned liquid is used in lieu of water for forming the paste, such solution will provide a coat in the form of a thin film over each particle of the powdered sillimanite during the mixing of the paste. This film is desirable, as it fuses or sinters at a lower temperature than the particles themselves when the mass is being fired, and in doing so the films will act as binders for uniting the particles of sillimanite.

The excess liquid can be removed from the paste by decantation or otherwise, and then the paste can be shaped to the desired forms by means of molds or other suitable means. The molds, by preference, should be lined with a liquid absorbing material, such as cloth or blotting paper. The paste is permitted to set, and while the setting action is taking place, the molds may be shaken from time to time to cause the closest packing and fitting together of the various sized and shaped particles, while the remaining liquid evaporates and drains off.

When the paste has dried, the article formed therefrom may then be fired to a temperature necessary to cause a sintering of the material. In the firing operation the articles may, if so desired, be first heated to a temperature of approximately 1000° C. to bake the material sufficiently to permit handling and finishing by grinding, cutting or chipping the articles into the desired shape without causing them to disintegrate. Then the articles may be heated to a temperature of about 1400° C. to 1450° C. for firmly sintering the material.

The specific gravity of a block of sintered sillimanite formed by the above described manner is about 2.2, while the specific gravity of pure crystalline sillimanite is about 3.2; therefore, if increased density is needed or desired in the final product, such increased density may be attained by adding larger sized particles of pure sillimanite to the paste before molding.

If the blocks, after being fired to a temperature of about 1400° to 1450° C., are found to be porous, the exterior surfaces thereof can be glazed by means of a flame of sufficient temperature to cause a melting or fusion of the particles of sillimanite. The temperature of the flame should be sufficient to heat the surface of the blocks to about 1800° C., for at this temperature the sillimanite will commence to melt, thereby closing all exterior pores, and in this manner prevent molten glass from being absorbed in the blocks with perhaps a slight injurious effect thereto.

It is to be understood that in most instances the amount of porosity in the blocks will not be detrimental to their use in glass melting containers, but if this porosity is too great, the blocks can be subjected to a flame in the manner above pointed out to cause a fusion of the exterior particles of sillimanite.

Having thus described my invention what I claim is:—

1. A batch for a refractory product containing a crystalline aluminum silicate and a binder containing aluminum hydroxide and silicic acid.

2. A batch for a refractory product containing a crystalline aluminum silicate in the form of fine particles and a binder containing aluminum hydroxide and silicic acid.

3. A batch for a refractory product containing a crystalline aluminum silicate in the form of fine and coarse particles and a binder containing aluminum hydroxide and silicic acid.

4. A batch for a refractory product consisting of a crystalline aluminum silicate in the form of a powder and a binder containing a gel including aluminum hydroxide and silicic acid.

5. A batch for a refractory product consisting of powdered sillimanite and a binder with a 1:1 molecular ratio of alumina and silica in hydrated form.

In testimony whereof I hereunto sign my name this 26th day of April, 1923.

HARRISON P. HOOD.